United States Patent Office 3,736,130
Patented May 29, 1973

3,736,130
ALLOY
Frederick T. Wishnie, 2350 Pine St.,
Seaford, N.Y. 11783
No Drawing. Continuation of abandoned application Ser.
No. 664,227, Aug. 2, 1967. This application Sept. 17,
1970, Ser. No. 73,074
Int. Cl. C22c 9/06
U.S. Cl. 75—154  4 Claims

ABSTRACT OF THE DISCLOSURE

An alloy comprising the following constituents in the following range of percentages by weight: nickel 5 to 27%, castability promoting elements 1.2 to 8%, hardness promoting elements .5 to 9.5%, with the balance being copper.

---

This application is a continuation of application Ser. No. 664,227 filed Aug. 2, 1967, now abandoned.

The invention relates to a copper base alloy with additions of nickel, hardening alloys and castability alloys.

Heretofore, it has been known that copper tungsten sintered dies have been used for electrochemical machining. These dies are fabricated by the press forming of sintered copper tungsten powder. This process is expensive and does not lend itself to the maintenance of close tolerances. Also, when the copper tungsten sintered dies are used with an insufficient electrolyte, arcing occurs on the die which causes damaging pit marks on these dies. Heretofore no alloy has been available for the repair of these dies and when these expensive dies were damaged they were scrapped.

It is the general object of this invention to avoid the foregoing prior art practices by the provision of an alloy capable of being cast for utility as an electrochemical machining die.

Another object of this invention is to provide an alloy suitable for use with highly corrosive electrolytes.

Yet another object of this invention is to provide an alloy with good electrical conductivity.

Still another object of this invention is to provide a machinable alloy with good wear resistance.

A further object of this invention is to provide a welding filler alloy capable of weld depositing with good bond strength on copper tungsten sintered base materials.

A yet further object of the invention is to provide an alloy capable of being cast without experiencing segregation.

The experimentation preceding this invention commenced with the objective of discovering an alloy system that would have all of the essential properties of the copper tungsten sintered structure e.g. high corrosion resistance, good electrical conductivity and high wear resistance, but which alloy system would in addition be a castable homogeneous alloy capable of machining and most important capable of being deposited by welding on copper tungsten sintered base material. In the course of the research and experimentation a number of alloy systems were employed. After suitable testing it was determined that a copper system with moderate nickel additions produced the best results for good machinability, electrical conductivity and corrosive resistance.

To the basic copper nickel system various elements with high hardness were added to increase the wear resistance. The majority of the alloy systems with these additional elements were found to lack the required machinability and the desired high electrical conductivity. After some lengthy experimentation it was found that particular weight percent ranges of hardness promoting elements such as chromium, silicon and iron when added to the basic copper nickel alloy system produced desired results in maintaining machinability, electrical conductivity and corrosion resistance while imparting to the overall alloy system good resistance to wear. In connection with this phase of the work it was discovered that the cumulative total of the alloy additions with high hardness characteristics to be added to the alloy system of the invention must not be greater than 9.5 percent by weight.

Finally, the alloy system had to be provided with castability and superior surface wetting properties.

The final alloy system had to be castable as a homogeneous alloy system without the segregation of elements. Also, since the end alloy system was to be utilized as a welding alloy especially directed to copper tungsten sintered base materials the end alloy had to have superior surface wetting characteristics. After additional modifications to various alloy systems comprising the foregoing elements it was discovered that additions of castability promoting elements such as phosphorous and boron in controlled weight percent ranges with a sum weight percent additions below 8 percent provided good castability and superior surface wetting characteristics. In addition the resultant alloy system of the invention was found to have good flow characteristics, good fluxing action and exceptional deoxidation properties.

Finally it was found that small additions of tin improved the overall flow characteristics of the alloy system.

The alloy system of the invention comprises the following elements in the weight percentages indicated.

| Element | Broad range, wt. percent | Preferred range, wt. percent |
|---|---|---|
| Nickel | 5-27 | 12-20 |
| Castability promoting elements | 1.2-8 | 1.85-6.2 |
| Hardness promoting elements | .5-9.5 | 1.7-5.4 |
| Tin | 0-.6 | 0-.3 |

Typical hardness promoting elements of the foregoing alloy system comprise the following elements in the weight percent indicated.

| Element | Broad range, wt. percent | Preferred range, wt. percent |
|---|---|---|
| Chromium | .5-5 | .7-2.5 |
| Silicon | 0-3 | .7-1.5 |
| Iron | 0-3 | .3-1.6 |

Typical castability promoting elements of the foregoing alloy system comprise the following elements in the weight percent indicated.

| Element | Broad range, wt. percent | Preferred range, wt. percent |
|---|---|---|
| Phosphorus | 1-7.5 | 1.5-3.4 |
| Boron | .2-2 | .35-1.3 |

The foregoing alloy system has been found to have utility as a general alloy, as a castable alloy and as a welding alloy. As a castable alloy the present alloy can be used as a die in electrochemical machining.

As a welding product the present alloy has good welding characteristics and can be weld deposited on sintered copper tungsten base materials. The alloy system of the invention can be fabricated, for welding deposition, as a rod, as a homogeneous powder, as a tubular rod with powder filler metal, as a heterogeneous powder, as an electrode or as wire or as any of other forms of known welding products. The aforementioned welding products are of course utilized with the applicable welding processes well known in the arts.

What is claimed is:
1. An alloy comprising the following constituents in the following range of percentages by weight:

| | Percent |
|---|---|
| Nickel | 5 to 27 |
| Chromium | 0.5 to 5 |
| Silicon | 0 to 3 |
| Iron | 0 to 3 |
| Phosphorus | 1 to 7.5 |
| Boron | .2 to 2 |
| Tin | 0 to 0.6 |
| Copper | Balance | wherein the sum of the chromium, silicon and iron content is up to 9.5 weight percent of the alloy.

2. An alloy comprising the following constituents in the following range of percentages by weight:

| | Percent |
|---|---|
| Nickel | 12 to 20 |
| Chromium | 0.7 to 2.5 |
| Silicon | 0.7 to 1.5 |
| Iron | 0.3 to 1.6 |
| Phosphorus | 1.0 to 7.5 |
| Boron | .35 to 1.3 |
| Tin | 0 to 0.6 |
| Copper | Balance | wherein the sum of the chromium, silicon and iron content is up to 9.5 weight percent of the alloy.

3. The alloy of claim 1 wherein said alloy is a cast rod.

4. The alloy of claim 1 wherein said alloy is homogeneous powder.

References Cited
UNITED STATES PATENTS

| 2,430,306 | 11/1947 | Smith | 75—159 |
|---|---|---|---|
| 2,755,182 | 7/1956 | Cape | 75—159 |
| 2,768,893 | 10/1956 | Bradzs | 75—159 |
| 2,891,860 | 6/1959 | Woolard | 75—159 |
| 2,911,298 | 11/1959 | Woolard | 75—159 |
| 3,293,029 | 12/1966 | Broderick et al. | 75—154 X |
| 3,340,049 | 9/1967 | Quaas et al. | 75—154 |
| 3,392,017 | 7/1968 | Quaas et al. | 75—159 X |
| 3,545,945 | 12/1970 | Petersen | 75—159 X |

CHARLES N. LOVELL, Primary Examiner

U.S. Cl. X.R.

75—159, 160